US010670467B2

(12) United States Patent
Wang et al.

(10) Patent No.: US 10,670,467 B2
(45) Date of Patent: Jun. 2, 2020

(54) DEVICE FOR MEASURING SURFACE TEMPERATURE OF TURBINE BLADES (71) Applicant: UNIVERSITY OF ELECTRONIC SCIENCE AND TECHNOLOGY OF CHINA, Chengdu (CN)

(72) Inventors: Chao Wang, Chengdu (CN); Jun Hu, Chengdu (CN); Fei Wang, Chengdu (CN); Zezhan Zhang, Chengdu (CN); Jing Jiang, Chengdu (CN); Jie Xiong, Chengdu (CN); Yueming Wang, Chengdu (CN); Tiezhong Ma, Chengdu (CN); Dong Yan, Chengdu (CN); Xueke Gou, Chengdu (CN); Ting Zhou, Chengdu (CN); Yi Niu, Chengdu (CN); Pei Huang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 249 days.

(21) Appl. No.: 15/865,297

(22) Filed: Jan. 9, 2018

(65) Prior Publication Data
US 2018/0195907 A1 Jul. 12, 2018

(30) Foreign Application Priority Data
Jan. 9, 2017 (CN) .......................... 2017 1 0014851

(51) Int. Cl.
G01J 5/00 (2006.01)
G01K 1/00 (2006.01)
(Continued)

(52) U.S. Cl.
CPC ............ *G01J 5/0859* (2013.01); *G01K 1/024* (2013.01); *F01D 17/085* (2013.01);
(Continued)

(58) Field of Classification Search
USPC ................................ 374/130, 121, 208, 141
See application file for complete search history.

(56) References Cited

U.S. PATENT DOCUMENTS

| 2006/0017932 | A1* | 1/2006 | Riza ......................... G01J 5/38 356/484 |
| 2014/0033799 | A1* | 2/2014 | Newman .................. G01B 9/02 73/37 |
| 2014/0063227 | A1* | 3/2014 | Baleine .............. G02B 23/2492 348/82 |

* cited by examiner

Primary Examiner — Mirellys Jagan
(74) Attorney, Agent, or Firm — Matthias Scholl P.C.; Matthias Scholl (57) ABSTRACT A device for measuring surface-temperature of a turbine blade, the device including a probe having a front-end mirror for receiving infrared radiation of a surface on the blade, a collimation lens for refracted the infrared radiation, a PD detector to receive the infrared radiation, and a focal-length servo; and a radial-scanning servo connected to the probe. The front-end mirror, the collimation lens, and PD detector are disposed along the optical axis of the collimation lens. The focal-length servo is adapted to move the collimation lens along the optical axis of the collimation lens. The radial-scanning servo is adapted to move the probe along the optical axis of the collimation lens. The device of the invention is capable of accurately targeting a particular point on the blade having an irregular shape for temperature measurement to accurately detect the temperature distribution on the surface of the blade.

16 Claims, 5 Drawing Sheets (51) Int. Cl.
*G01K 13/00* (2006.01)
*G01J 5/08* (2006.01)
*G01K 1/02* (2006.01)
*F01D 17/08* (2006.01)

(52) U.S. Cl.
CPC ...... *F05D 2260/80* (2013.01); *F05D 2260/83* (2013.01); *F05D 2270/804* (2013.01); *G01J 2005/0085* (2013.01)

DEVICE FOR MEASURING SURFACE TEMPERATURE OF TURBINE BLADES

CROSS-REFERENCE TO RELATED APPLICATIONS

Pursuant to 35 U.S.C. § 119 and the Paris Convention Treaty, this application claims the benefit of Chinese Patent Application No. 201710014851.5 filed Jan. 9, 2017, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The disclosure relates to the field of aerospace, and, in particular, to a device for measuring surface temperature of turbine blades.

Description of the Related Art

The temperature distribution on the surface of a turbine blade determines the condition and performance of the turbine. Temperature measurement of the surface of a turbine blade can be divided into a contact type and a non-contact type. The contact temperature measurement suffers from low measurement accuracy, low response speed, susceptibility to gas pollution, and decreases durability.

In addition. due to the irregular shape of the turbine engine blades and the narrow distance between two adjacent blades, conventional non-contact measuring methods tend to be adversely affected by high rotation speed of the blades, and do not allow for accurate detection of the real radiation intensity of each area on the blade.

SUMMARY OF THE INVENTION

In view of the above-described problems, it is one objective of the invention to provide an improved device for measuring surface temperature of turbine blades.

To achieve the above objectives, in accordance with one embodiment of the invention, there is provided a device for measuring the temperature of a surface of a turbine blade, the device comprising: a probe comprising a signal acquisition module and a focal-length servo, a signal processing and control module, and a radial-scanning servo. The signal acquisition module includes: a PD detector, a collimation lens, and a front-end mirror; in which: the PD detector, the collimation lens, and the front-end mirror are disposed in sequence along the optical axis of the collimation lens; the front-end mirror is disposed close to the turbine blade with respect to the PD detector and the collimation lens; the front-end mirror is adapted to reflect infrared rays radiated by the surface to impinge on the collimation lens; the collimation lens is adapted to refract the infrared rays impinged thereon to impinge on the PD detector; the PD detector is adapted to receive the infrared rays impinged thereon, and transmit the receive infrared rays to the signal processing and control module; the signal processing and control module is adapted to analyze the received infrared rays to calculate the temperature of the surface; the optical axis of the collimation lens is disposed parallel to a radial direction of the turbine blade; the probe is movable along the optical axis of the collimation lens; the radial-scanning servo is connected to the probe, and is adapted to move the probe; the collimation lens is movable along the optical axis of the collimation lens; the focal-length servo is connected to the collimation lens, and is adapted to move the collimation lens; and the radial-scanning servo and the focal-length servo are controlled by the signal processing and control module.

In a class of one embodiment, the probe further comprises a transparent separation, and a protective shell comprising a protruded part and a main part; the front-end mirror is disposed within the protruded part; the focal-length servo and the remaining of the signal acquisition module are disposed within the main part; the protruded part is inserted into the housing enclosing the turbine blade, and the main part is disposed outside the housing enclosing the turbine blade; the transparent separation is disposed between the main part and the protruded part; and the protruded part comprises a light opening for allowing the infrared rays radiated by the surface to pass through.

In a class of one embodiment, the protruded part comprises a vent opening, and the vent opening is adapted for blowing cold air.

In a class of one embodiment, a filter lens is disposed between the PD detector and the collimation lens and along the optical axis of the collimation lens; and the filter lens is adapted to transmit infrared rays in a particular range of wave length to the PD detector.

In a class of one embodiment, a group of a focusing lens and a diaphragm is disposed between the collimation lens and the filter lens.

In a class of one embodiment, the signal processing and control module comprises an amplifier, a signal acquisition module, and a main controller; the amplifier is adapted to receive the infrared rays transmitted to the signal processing and control module; the signal acquisition module is adapted to collect synchronous speed signal with respect to the turbine blade, and transmit the synchronous speed signal to the main controller; the main controller is adapted to control the signal acquisition module to selectively collect the infrared rays received by the amplifier according to the synchronous speed signal.

In a class of one embodiment, the signal processing and control module further comprises a motion servo controller for controlling the radial-scanning servo and the focal-length servo, and the motion servo controller is controlled by the main controller.

In a class of one embodiment, the transparent separation is a quartz glass.

In addition, the invention provides another device for measuring the temperature of a surface of a turbine blade, comprising: a probe comprising a signal acquisition module and a focal-length servo; a signal processing and control module; and a radial-scanning servo; in which the signal acquisition module comprises a first spectroscope, a first PD detector, a first filter lens, a second spectroscope, a second PD detector, a second filter lens, a third PD detector, a third filter lens, a collimation lens, and a front-end mirror; the third PD detector, the third filter lens, the second spectroscope, the first spectroscope, the collimation lens, and the front-end mirror are disposed in sequence along the optical axis of the collimation lens; the front-end mirror is disposed close to the turbine blade with respect to the third PD detector, the third filter lens, the second spectroscope, the first spectroscope, the collimation lens; the front-end mirror is adapted to reflect infrared rays radiated by the surface to impinge on the collimation lens; the collimation lens is adapted to refract the infrared rays impinged on the collimation lens to impinge on the first spectroscope; the first spectroscope is adapted to refract a portion of the infrared rays impinged on the first spectroscope to impinge on the second spectroscope, and reflect the remaining portion of the infrared rays impinged on the first spectroscope to impinge on the first filter lens; the second spectroscope is adapted to refract a portion of the infrared rays impinged on the second spectroscope to impinge on the third filter lens, and reflect the remaining portion of the infrared rays impinged on the second spectroscope to impinge on the second filter lens; the first filter lens, the second filter lens, and the third filter lens are adapted to respectively transmit infrared rays in three individual ranges of wave length to the first PD detector, the second PD detector, and the third PD detector; the first PD detector, the second PD detector, and the third PD detector are adapted to respectively receive the infrared rays transmitted to them, and transmit the infrared rays received by them to the signal processing and control module; the signal processing and control module is adapted to analyze the infrared rays transmitted to the signal processing and control module to calculate the temperature of the surface; the optical axis of the collimation lens is disposed parallel to a radial direction of the turbine blade; the probe is movable along the optical axis of the collimation lens; the radial-scanning servo is connected to the probe, and is adapted to move the probe; the collimation lens is movable along the optical axis of the collimation lens; the focal-length servo is connected to the collimation lens, and is adapted to move the collimation lens; and the radial-scanning servo and the focal-length servo are controlled by the signal processing and control module.

In a class of one embodiment, the probe further comprises a transparent separation, and a protective shell comprising a protruded part and a main part;

the front-end mirror is disposed within the protruded part; the focal-length servo and the remaining of the signal acquisition module are disposed within the main part; the protruded part is inserted into the housing enclosing the turbine blade, and the main part is disposed outside the housing enclosing the turbine blade; the transparent separation is disposed between the main part and the protruded part; and the protruded part comprises a light opening for allowing the infrared rays radiated by the surface to pass through.

In a class of one embodiment, the protruded part comprises a vent opening, and the vent opening is adapted for blowing cold air.

In a class of one embodiment, three groups of a focusing lens and a diaphragm are disposed respectively between the first spectroscope and the first filter lens, between the second spectroscope and the second filter lens, and between the second spectroscope and the third filter lens.

In a class of one embodiment, the signal processing and control module comprises an amplifier, a signal acquisition module, and a main controller; the amplifier is adapted to receive the infrared rays transmitted to the signal processing and control module; the signal acquisition module is adapted to collect synchronous speed signal with respect to the turbine blade, and transmit the synchronous speed signal to the main controller; the main controller is adapted to control the signal acquisition module to selectively collect the infrared rays received by the amplifier according to the synchronous speed signal.

In a class of one embodiment, the signal processing and control module further comprises a motion servo controller for controlling the radial-scanning servo and the focal-length servo, and the motion servo controller is controlled by the main controller.

In a class of one embodiment, the transparent separation is a quartz glass.

In addition, the invention provides another device for measuring the temperature of a surface of a turbine blade, comprising: a probe comprising a signal acquisition module and a focal-length servo; a signal processing and control module; and a radial-scanning servo; in which the signal acquisition module comprises a light source, a first spectroscope, a first PD detector, a first filter lens, a second spectroscope, a second PD detector, a second filter lens, a collimation lens, and a front-end mirror; the light source, the second spectroscope, the first spectroscope, the collimation lens, and the front-end mirror are disposed in sequence along the optical axis of the collimation lens; the front-end mirror is disposed close to the turbine blade with respect to the light source, the second spectroscope, the first spectroscope, the collimation lens; the front-end mirror is adapted to reflect infrared rays radiated by the surface to impinge on the collimation lens; the collimation lens is adapted to refract the infrared rays impinged on the collimation lens to impinge on the first spectroscope; the first spectroscope is adapted to refract a portion of the infrared rays impinged on the first spectroscope to impinge on the second spectroscope, and reflect the remaining portion of the infrared rays impinged on the first spectroscope to impinge on the first filter lens; the second spectroscope is adapted to refract a portion of the infrared rays impinged on the second spectroscope to impinge on the light source, and reflect the remaining portion of the infrared rays impinged on the second spectroscope to impinge on the second filter lens; the first filter lens and the second filter lens are adapted to respectively transmit infrared rays in two individual ranges of wave length to the first PD detector and the second PD detector; the first PD detector and the second PD detector are adapted to respectively receive the infrared rays transmitted to them, and transmit the infrared rays received by them to the signal processing and control module; the signal processing and control module is adapted to analyze the infrared rays transmitted to the signal processing and control module to calculate the temperature of the surface; the optical axis of the collimation lens is disposed parallel to a radial direction of the turbine blade; the probe is movable along the optical axis of the collimation lens; the radial-scanning servo is connected to the probe, and is adapted to move the probe; the collimation lens is movable along the optical axis of the collimation lens; the focal-length servo is connected to the collimation lens, and is adapted to move the collimation lens; and the radial-scanning servo and the focal-length servo are controlled by the signal processing and control module.

The device disclosed in the invention are not only suitable for the temperature measurement with respect to the surfaces of the turbine blades that move in a high speed and at a high temperature, but also for objects that move in other speed and at other temperature. Compared with the conventional static temperature measurement in which only the temperature of a point is detected and the one-dimensional temperature measurement in which only the temperatures along a line are detected, the two-dimensional temperature measurement in this invention allows for accurately detecting the temperatures on a surface. In particular, the device in the invention is accurately controlled to move along two directions for detection and, therefore can accurately monitor the temperature of each small area on a two-dimension surface. Therefore, the device in the invention can accurately detect the temperature distribution on a surface. The device of the invention adopts the high rate of sampling rate to collect information of more than 1000 samples in 1 second, which achieves a highly accurate temperature. In addition, the device of the invention collects the rotation information of the blade to obtain the motion period of the blade, and according to the motion period, picks out the information about the particular target point to calculate the temperature of the point. Once the measurement for temperature of a first point is finished, the device is accurately controlled to target a second point that is adjacent to the first point. Repeat the previous process, the device provides temperatures in various regions of the blade to obtain the temperature distribution on the entire surface of the blade.

DETAILED DESCRIPTION OF THE EMBODIMENTS

For further illustrating the invention, experiments detailing a device for measuring temperature of a surface of a turbine blade are described below.

Figure 1:
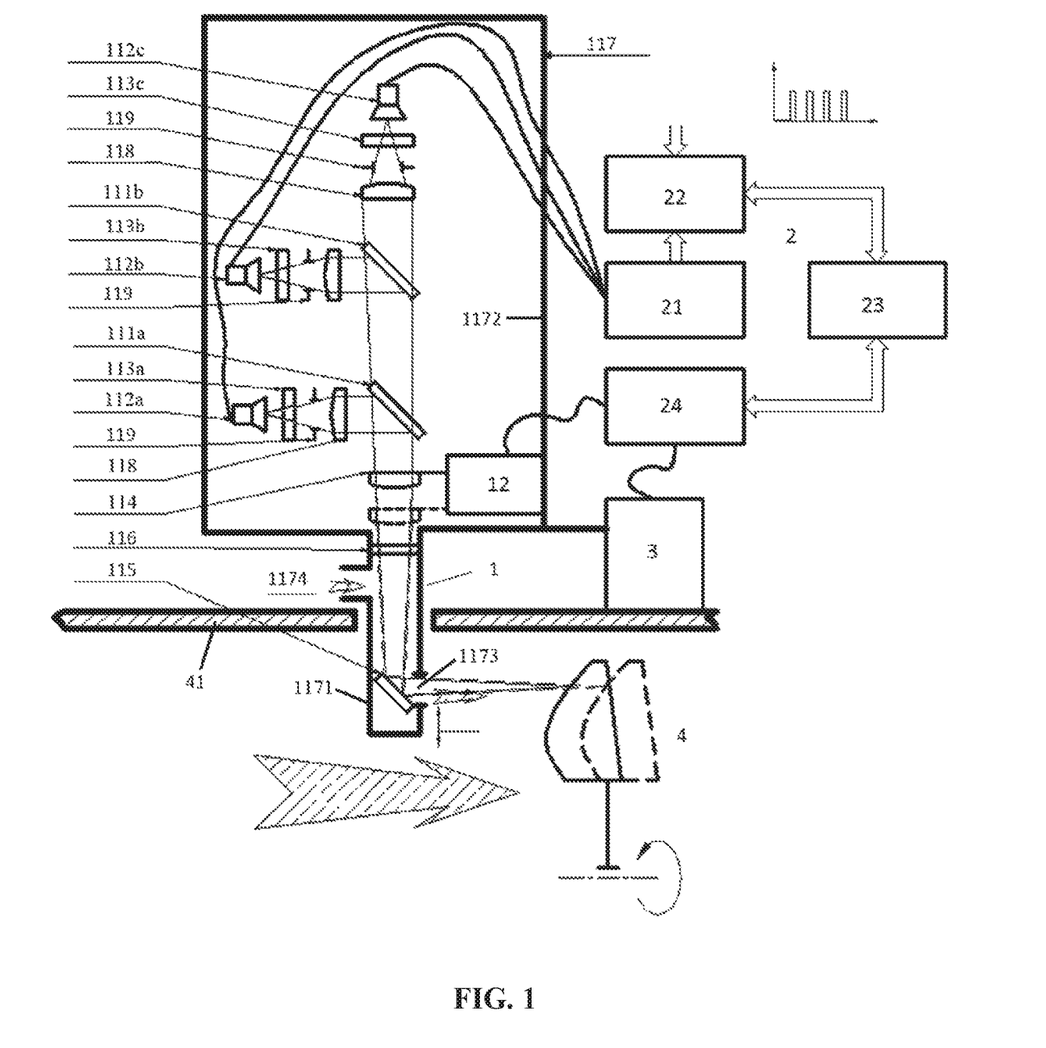
FIG. 1 is a schematic diagram of a device for measuring surface temperature of turbine blades according to one embodiment.
Figure 2:
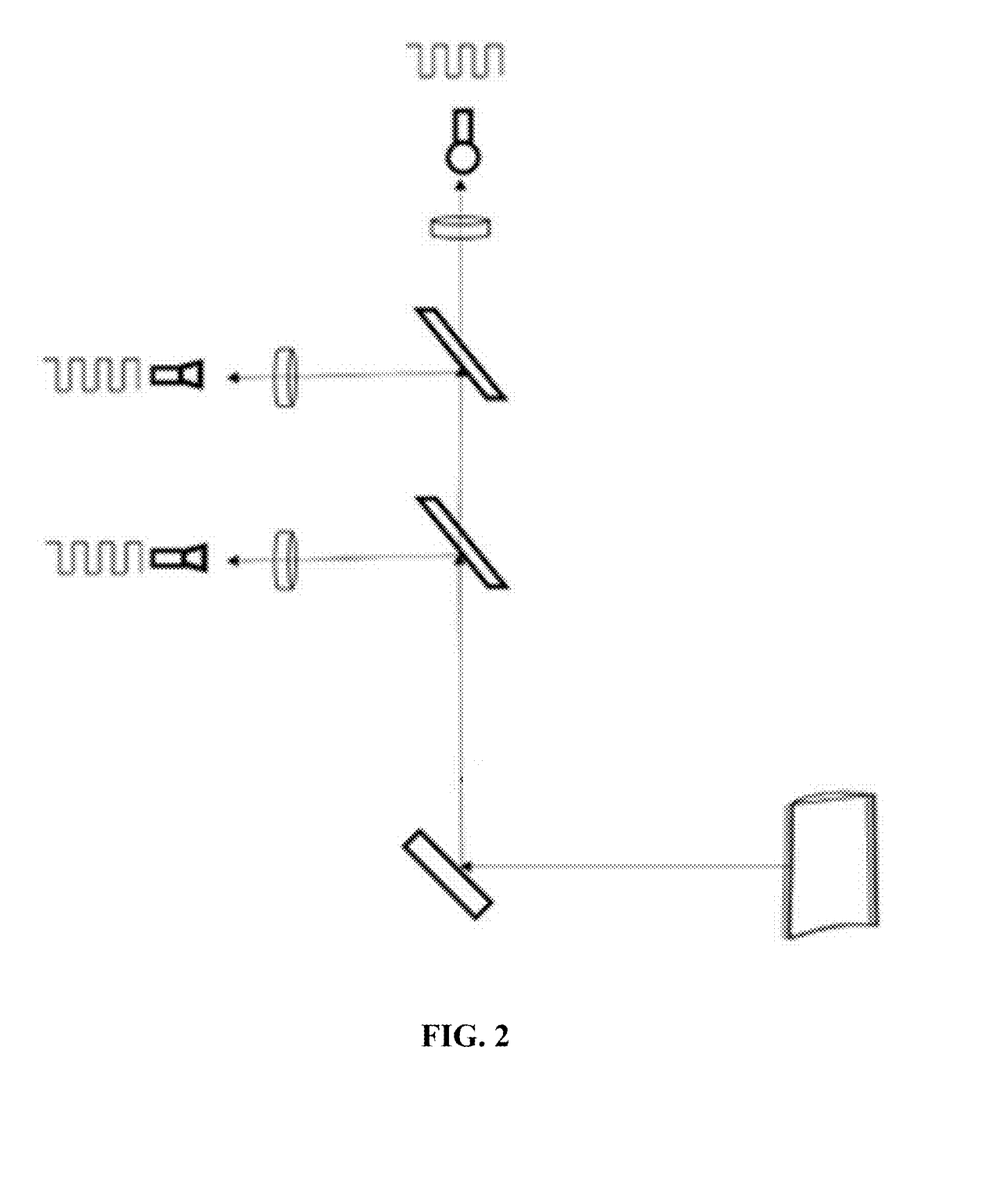
FIG. 2 is a diagram of an optical path inside a probe according to one embodiment.
Figure 3:
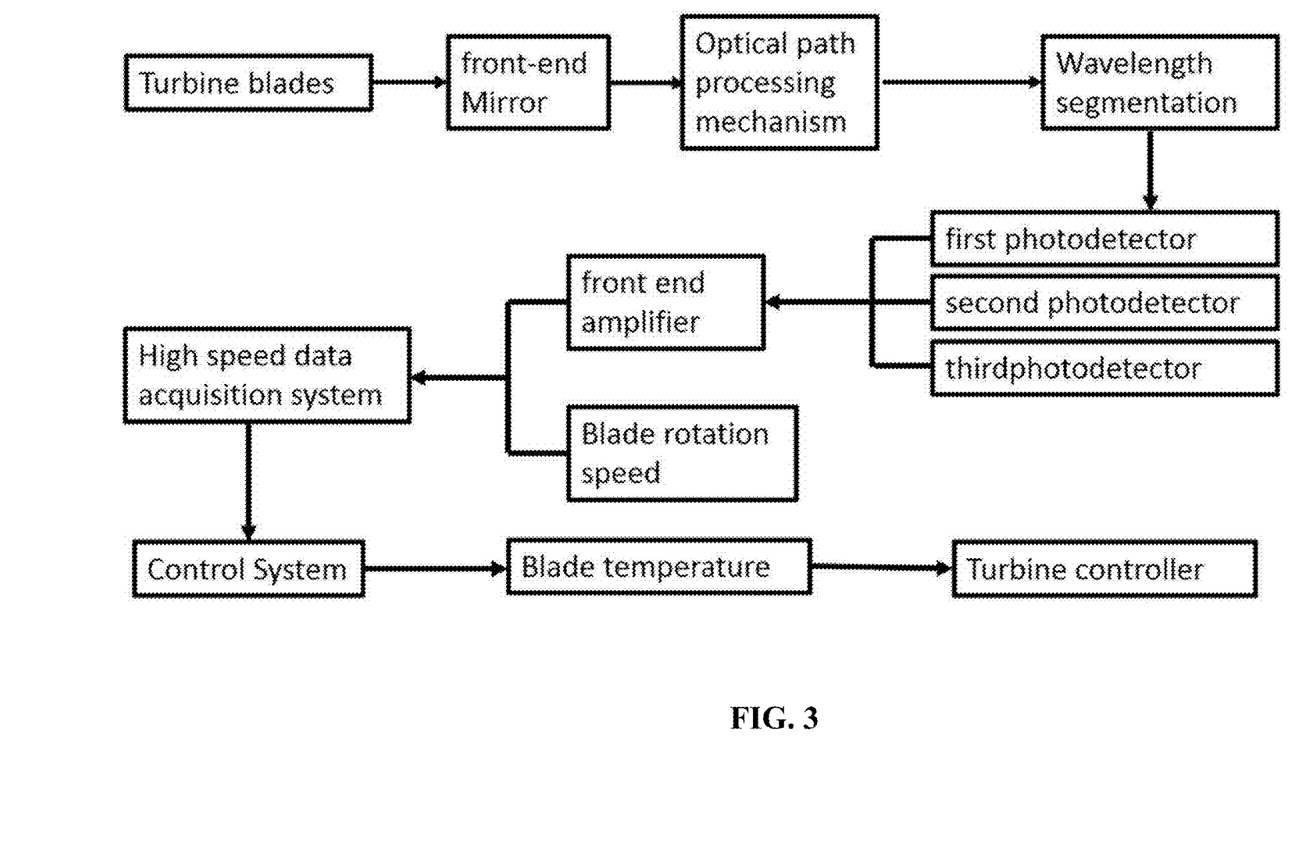
FIG. 3 is a structural block diagram of a device for measuring surface temperature of turbine blades according to one embodiment.
Figure 4:
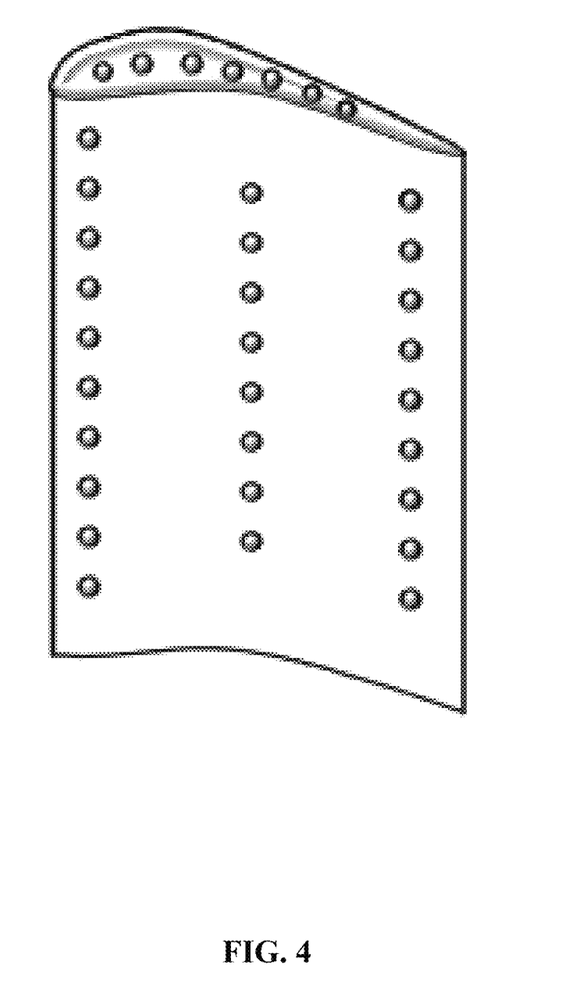
FIG. 4 is a schematic view of a turbine blade according to one embodiment.

FIG. 1 shows a device for measuring temperature of a surface of a turbine blade, the device comprising: a probe 1 comprising a signal acquisition module 11 and a focal-length servo 12; a signal processing and control module 2; and a radial-scanning servo 3. The signal acquisition module 11 comprises a first spectroscope 111a, a first PD detector 112a, a first filter lens 113a, a second spectroscope 111b, a second PD detector 112b, a second filter lens 113b, a third PD detector 112c, a third filter lens 113c, a collimation lens 114, and a front-end mirror 115. The third PD detector 112c, the third filter lens 113c, the second spectroscope 111b, the first spectroscope 111a, the collimation lens 114, and the front-end mirror 115 are disposed in sequence along the optical axis of the collimation lens 114. The front-end mirror 115 is disposed close to the turbine blade 4 with respect to the third PD detector 112c, the third filter lens 113c, the second spectroscope 111b, the first spectroscope 111a, and the collimation lens 114. The front-end mirror 115 is adapted to reflect infrared rays radiated by the surface of the blade 4 to impinge on the collimation lens 114. The collimation lens 114 is adapted to refract the infrared rays impinged thereon to impinge on the first spectroscope 111a. The first spectroscope 111a is adapted to refract a portion of the infrared rays impinged thereon to impinge on the second spectroscope 111b, and reflect the remaining portion to impinge on the first filter lens 113a. The second spectroscope 111b is adapted to refract a portion of the infrared rays impinged thereon to impinge on the third filter lens 113c, and reflect the remaining portion to impinge on the second filter lens 113b. The first filter lens 113a, the second filter lens 113b, and the third filter lens 113c are adapted respectively transmit infrared rays in three individual ranges (the three ranges are different from each other) of wave length to the first PD detector 112a, the second PD detector 112b, and the third PD detector 112c. The first PD detector 112a, the second PD detector 112b, and the third PD detector 112c are adapted to respectively receive the infrared rays transmitted to them, and transmit the infrared rays received by them to the signal processing and control module 2. The signal processing and control module 2 is adapted to analyze the infrared rays transmitted therein to calculate the temperature of the surface of the blade 4. The optical axis of the collimation lens 114 is disposed parallel to a radial direction of the blade 4. The probe 1 is movable along the optical axis of the collimation lens 114. The radial-scanning servo 3 is connected to the probe 1, and is adapted to move the probe. The collimation lens 114 is movable along the optical axis of the collimation lens 114. The focal-length servo 12 is connected to the collimation lens 114, and is adapted to move the collimation lens 114. The radial-scanning servo 3 and the focal-length servo 12 are controlled by the signal processing and control module 2.

Figure 5:
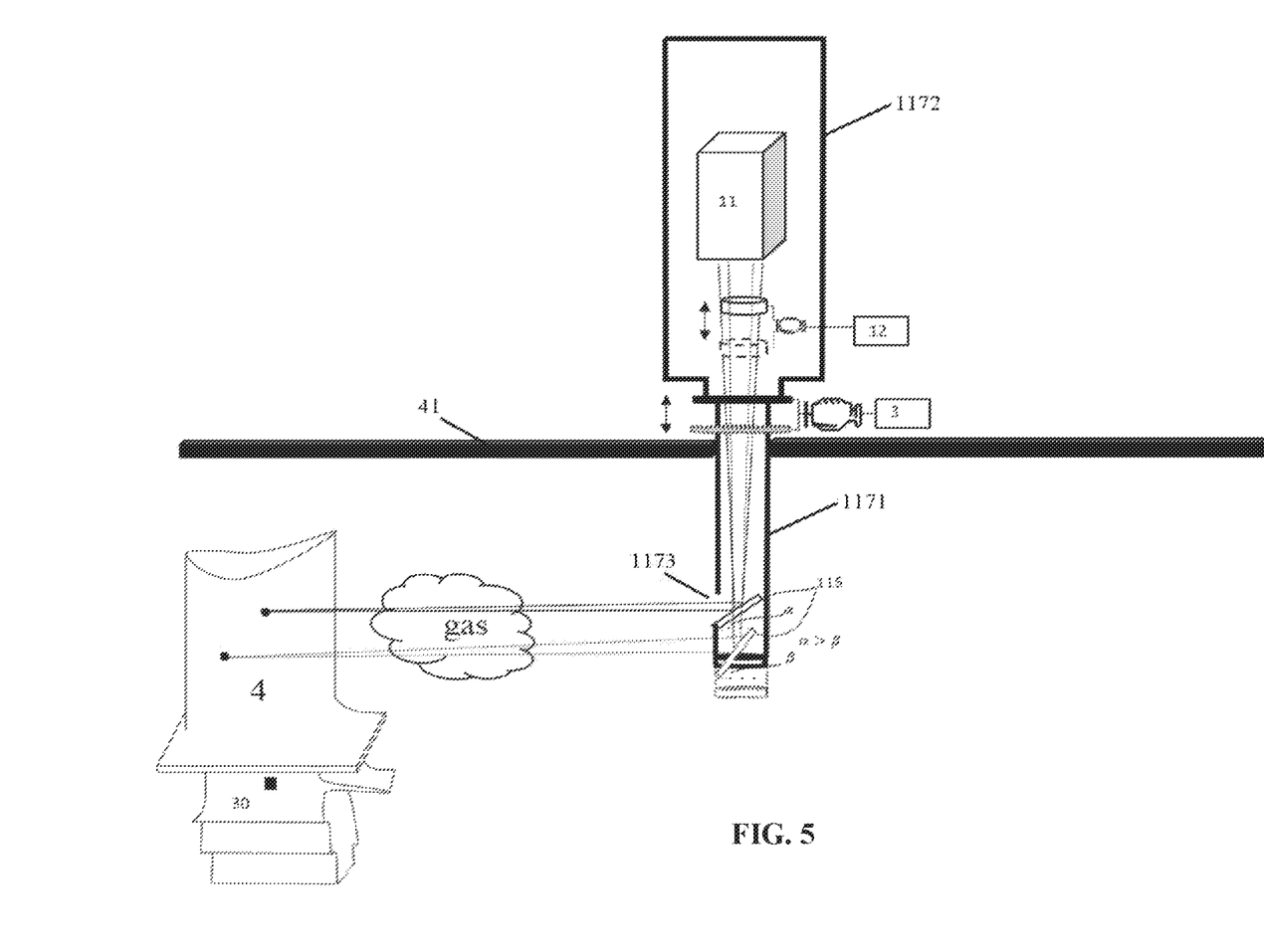
FIG. 5 is an operating schematic diagram of a device for measuring surface temperature of turbine blades according to one embodiment.

In a class of one embodiment, as shown in FIG. 1, the probe further comprises a transparent separation 116 and a protective shell 117; and the protective shell 117 comprises a protruded part 1171 and a main part 1172. The transparent separation 116 is disposed between the main part 1172 and the protruded part 1171. The transparent separation 116 assists to prevent heat, gas, or other pollution materials from entering into the main part 1172. The front-end mirror 115 is disposed within the protruded part 1171; the focal-length servo 12 and the remaining of the signal acquisition module 11 are disposed within the main part 1172. The protruded part 1171 is inserted into the housing 41 that encloses the turbine blade 4, and the main part 1172 is disposed outside the housing 41 enclosing the turbine blade 4, as shown in FIG. 5. The protruded part 1171 comprises a light opening 1173 through which the infrared rays radiated by the surface of the blade pass through.

In a class of one embodiment, as shown in FIG. 1, the protruded part 1171 comprises a vent opening 1174, and the vent opening 1174 is adapted for blowing cold air to assist lowering temperature within the protruded part 1171 and cleaning the front-end mirror 115.

In a class of one embodiment, as shown in FIG. 1, three groups of a focusing lens 118 and a diaphragm 119 are disposed respectively between the first spectroscope 111a and the first filter lens 113a, between the second spectroscope 111b and the second filter lens 113b, and between the second spectroscope 111b and the third filter lens 113c.

In a class of one embodiment, as shown in FIG. 1, the signal processing and control module 2 comprises an amplifier 21, a signal acquisition module 22, and a main controller 23. The amplifier 21 is adapted to receive the infrared rays transmitted to signal processing and control module 2. The signal acquisition module 22 is adapted to collect synchronous speed signal with respect to the turbine blade 4, and transmit the synchronous speed signal to the main controller 23. The main controller 23 is adapted to determine the rotating period of the blade according to the synchronous speed signal, and control the signal acquisition module to selectively collect the infrared rays received by the amplifier 21 that belong to the same point on the blade 4 according to the rotating period.

In a class of one embodiment, as shown in FIG. 1, the signal processing and control module 2 further comprises a motion servo controller 24 for controlling the radial-scanning servo 3 and the focal-length servo 12, and the motion servo controller 24 is controlled by the main controller 23.

In a class of one embodiment, the transparent separation 116 is a quartz glass.

The front-end mirror 115 is movable in a high frequency within a certain angle range to receive infrared lights of the points in different orientation with respect to the probe.

The device comprises PD detectors each of which detect radiation signals in an individual range of wave length. Therefore, by analyzing the three types of signals in three bands, the device provides accurate temperature. In addition, the device is capable of precisely controlling the distance of transverse and radial directions with respect to the blade in the millimeter scale to precisely target a particular point on the blade surface.

In this invention, an aperture can be added to each PD detector for adjusting the light intake amount according to the situation.

The measurement of the different areas of the blade by the device is done by controlling the motion servo controller 24. First of all, the device controls the focal-length servo 12 to set a certain focal length, and then control the radial-scanning servo 3 to change the radial distance to target a particular point on the blade surface. At this time, the detected radiation signals are continuous during this process. And then, the radial distance is changed to target another point of the blade. In this way, the radiation information of a particular area is measured. Because the blade is irregular arc, the single adjustment of radial distance in the conventional way cannot allow for measuring the temperatures of a particular area on the blade. It needs to adjust the focal length of the lens which corresponds to the transverse distance with respect to the blade to realize the temperature measurement of the whole blade.

The size of the area detected by the device is very small with respect to size of the blade, hence it is not possible to collect the different areas of the blade at the same time. At the same time, turbine blades are rotated at high speed which requires a high sampling rate. Therefore, the device of invention is set to collect a point in a rotating circle. Under the required sampling rate, the device performs the adjustment to target different position by controlling the servo motion controller 24, according to the blade speed and the number of blades.

On the rotating shaft of the blade, there is a corresponding position sensor 30 for calculating the speed information of the blade.

The radiation information transmitted through the different PD detectors will be transmitted to the front-end amplifier 21 to enlarge. The collected signals are transmitted to the main controller 23, and the specific temperature information is obtained through the analysis and correction of the algorithm. On one hand, this temperature information is passed to the engine fuel controller to control the fuel amount and change the rotor speed through the fuel supply. On the other hand, temperature information is transmitted to the motion servo controller 24, which controls the focal length of the collimation lens 114 and the radial distance of the probe 1 with respect to the blade 4 according to the synchronous speed signal.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for measuring temperature of a surface of a turbine blade, the device comprising:
   a probe comprising a signal acquisition module and a focal-length servo, and said signal acquisition module comprising a PD detector, a collimation lens, and a front-end mirror;
   a signal processing and control module; and
   a radial-scanning servo;
   wherein:
   said PD detector, said collimation lens, and said front-end mirror are disposed in sequence along an optical axis of said collimation lens;
   said front-end mirror is adapted to be disposed close to the turbine blade with respect to said PD detector and said collimation lens;
   said front-end mirror is adapted to reflect infrared rays radiated by the surface to impinge on said collimation lens;
   said collimation lens is adapted to refract the infrared rays impinged on said collimation lens to impinge on said PD detector;
   said PD detector is adapted to receive the infrared rays impinged on said PD detector, and transmit the infrared rays received by said PD detector to said signal processing and control module;
   said signal processing and control module is adapted to analyze the infrared rays transmitted to said signal processing and control module to calculate the temperature of the surface;
   the optical axis of said collimation lens is adapted to be disposed parallel to a radial direction of the turbine blade;
   said probe is movable along the optical axis of said collimation lens;
   said radial-scanning servo is connected to said probe, and is adapted to move said probe;
   said collimation lens is movable along the optical axis of said collimation lens;
   said focal-length servo is connected to said collimation lens, and is adapted to move said collimation lens; and
   said radial-scanning servo and said focal-length servo are controlled by said signal processing and control module.

2. The device of claim 1, wherein:
   a filter lens is disposed between said PD detector and said collimation lens and along the optical axis of said collimation lens; and
   said filter lens is adapted to transmit infrared rays in a particular range of wavelength to said PD detector.

3. The device of claim 2, wherein a group of a focusing lens and a diaphragm is disposed between said collimation lens and said filter lens.

4. The device of claim 1, wherein:
   said signal processing and control module comprises an amplifier, a signal acquisition module, and a main controller;
   said amplifier is adapted to receive the infrared rays transmitted to said signal processing and control module;
   said signal acquisition module is adapted to collect a synchronous speed signal with respect to the turbine blade, and transmit the synchronous speed signal to said main controller; and
   said main controller is adapted to control said signal acquisition module to selectively collect the infrared rays received by said amplifier according to the synchronous speed signal.

5. The device of claim 4, wherein said signal processing and control module further comprises a motion servo controller for controlling said radial-scanning servo and said focal-length servo, and said motion servo controller is controlled by said main controller.

6. The device of claim 1, wherein:
said probe further comprises a transparent separation, and a protective shell comprising a protruded part and a main part;
said front-end mirror is disposed within said protruded part;
said focal-length servo and the remaining of said signal acquisition module are disposed within said main part;
said protruded part is adapted to be inserted into a housing enclosing the turbine blade, and said main part is adapted to be disposed outside the housing enclosing the turbine blade;
said transparent separation is disposed between the main part and said protruded part; and
said protruded part comprises a light opening for allowing the infrared rays radiated by the surface to pass through.

7. The device of claim 6, wherein said protruded part comprises a vent opening, and said vent opening is adapted for blowing cold air.

8. The device of claim 6, wherein said transparent separation is a quartz glass.

9. A device for measuring temperature of a surface of a turbine blade, the device comprising:
a probe comprising a signal acquisition module and a focal-length servo, and said signal acquisition module comprising a first spectroscope, a first PD detector, a first filter lens, a second spectroscope, a second PD detector, a second filter lens, a third PD detector, a third filter lens, a collimation lens, and a front-end mirror;
a signal processing and control module; and
a radial-scanning servo;
wherein:
said third PD detector, said third filter lens, said second spectroscope, said first spectroscope, said collimation lens, and said front-end mirror are disposed in sequence along an optical axis of said collimation lens;
said front-end mirror is adapted to be disposed close to the turbine blade with respect to said third PD detector, said third filter lens, said second spectroscope, said first spectroscope, and said collimation lens;
said front-end mirror is adapted to reflect infrared rays radiated by the surface to impinge on said collimation lens;
said collimation lens is adapted to refract the infrared rays impinged on said collimation lens to impinge on said first spectroscope;
said first spectroscope is adapted to refract a portion of the infrared rays impinged on said first spectroscope to impinge on said second spectroscope, and reflect the remaining portion of the infrared rays impinged on said first spectroscope to impinge on said first filter lens;
said second spectroscope is adapted to refract a portion of the infrared rays impinged on said second spectroscope to impinge on said third filter lens, and reflect the remaining portion of the infrared rays impinged on said second spectroscope to impinge on said second filter lens;
said first filter lens, said second filter lens, and said third filter lens are adapted to respectively transmit infrared rays in three individual ranges of wavelength to said first PD detector, said second PD detector, and said third PD detector;
said first PD detector, said second PD detector, and said third PD detector are adapted to respectively receive the infrared rays transmitted to them, and transmit the infrared rays received by them to said signal processing and control module;
said signal processing and control module is adapted to analyze the infrared rays transmitted to said signal processing and control module to calculate the temperature of the surface;
the optical axis of said collimation lens is adapted to be disposed parallel to a radial direction of the turbine blade;
said probe is movable along the optical axis of said collimation lens;
said radial-scanning servo is connected to said probe, and is adapted to move said probe;
said collimation lens is movable along the optical axis of said collimation lens;
said focal-length servo is connected to said collimation lens, and is adapted to move said collimation lens; and
said radial-scanning servo and said focal-length servo are controlled by said signal processing and control module.

10. The device of claim 9, wherein three groups of a focusing lens and a diaphragm are disposed respectively between said first spectroscope and said first filter lens, between said second spectroscope and said second filter lens, and between said second spectroscope and said third filter lens.

11. The device of claim 9, wherein:
said signal processing and control module comprises an amplifier, a signal acquisition module, and a main controller;
said amplifier is adapted to receive the infrared rays transmitted to said signal processing and control module;
said signal acquisition module is adapted to collect a synchronous, speed signal with respect to the turbine blade, and transmit the synchronous speed signal to said main controller; and
said main controller is adapted to control said signal acquisition module to selectively collect the infrared rays received by said amplifier according to the synchronous speed signal.

12. The device of claim 11, wherein said signal processing and control module further comprises a motion servo controller for controlling said radial-scanning servo and said focal-length servo, and said motion servo controller is controlled by said main controller.

13. The device of claim 9, wherein:
said probe further comprises a transparent separation, and a protective shell comprising a protruded part and a main part;
said front-end mirror is disposed within said protruded part;
said focal-length servo and the remaining; of said signal acquisition module are disposed within said main part;
said protruded part is adapted to be inserted into a housing enclosing the turbine blade, and said main part is adapted to be disposed outside the housing enclosing the turbine blade;
said transparent separation is disposed between the main part and said protruded part; and said protruded part comprises a light opening for allowing the infrared rays radiated by the surface to pass through.

14. The device of claim 13, wherein said protruded part comprises a vent opening, and said vent opening is adapted for blowing cold air.

15. The device of claim 13, wherein said transparent separation is a quartz glass.

16. A device for measuring temperature of a surface of a turbine blade, the device comprising:
a probe comprising a signal acquisition module and a focal-length servo, and said signal acquisition module comprising a light source, a first spectroscope, a first PD detector, a first filter lens, a second spectroscope, a second PD detector, a second filter lens, a collimation lens, and a front-end mirror;
a signal processing and control module; and
a radial-scanning servo;
wherein:
said light source, said second spectroscope, said first spectroscope, said collimation lens, and said front-end mirror are disposed in sequence along the optical axis of said collimation lens;
said front-end mirror is adapted to be disposed close to the turbine blade with respect to said light source, said second spectroscope, said first spectroscope, and said collimation lens;
said front-end mirror is adapted to reflect infrared rays radiated by the surface to impinge on said collimation lens;
said collimation lens is adapted to refract the infrared rays impinged on said collimation lens to impinge on said first spectroscope;
said first spectroscope is adapted to refract a portion of the infrared rays impinged on said first spectroscope to impinge on said second spectroscope, and reflect the remaining portion of the infrared rays impinged on said first spectroscope to impinge on said first filter lens;
said second spectroscope is adapted to refract a portion of the infrared rays impinged on said second spectroscope to impinge on said light source, and reflect the remaining portion of the infrared rays impinged on said second spectroscope to impinge on said second filter lens;
said first filter lens and said second filter lens are adapted to respectively transmit infrared rays in two individual ranges of wavelength to said first PD detector and said second PD detector;
said first PD detector and said second PD detector are adapted to respectively receive the infrared rays transmitted to them, and transmit the infrared rays received by them to said signal processing and control module;
said signal processing and control module is adapted to analyze the infrared rays transmitted to said signal processing and control module to calculate the temperature of the surface;
the optical axis of said collimation lens is adapted to be disposed parallel to a radial direction of the turbine blade;
said probe is movable along the optical axis of said collimation lens;
said radial-scanning servo is connected to said probe, and is adapted to move said probe;
said collimation lens is movable along the optical axis of said collimation lens;
said focal-length servo is connected to said collimation lens, and is adapted to move said collimation lens; and
said radial-scanning servo and said focal-length servo are controlled by said signal processing and control module.

* * * * *